United States Patent [19]
Arikawa et al.

[11] Patent Number: 5,715,149
[45] Date of Patent: Feb. 3, 1998

[54] HIGH-VOLTAGE POWER PACK

[75] Inventors: Sumitaka Arikawa; Masahiko Aiba, both of Nara, Japan

[73] Assignee: Sharp Kabushiki Kaisha, Osaka, Japan

[21] Appl. No.: 557,499

[22] Filed: Nov. 14, 1995

[30] Foreign Application Priority Data

Nov. 18, 1994 [JP] Japan ..................... 6-285603

[51] Int. Cl.$^6$ ........................................... H02M 3/335
[52] U.S. Cl. ..................... 363/21; 363/41; 363/97
[58] Field of Search ..................... 363/21, 41, 80, 363/89, 97; 323/282

[56] References Cited

U.S. PATENT DOCUMENTS

| | | | |
|---|---|---|---|
| 4,649,464 | 3/1987 | Shono | 363/21 |
| 4,727,463 | 2/1988 | Suzuki | 363/21 |
| 4,747,012 | 5/1988 | Maeba et al. | 363/21 X |
| 4,841,425 | 6/1989 | Maeba et al. | 363/21 |
| 5,285,368 | 2/1994 | Ishikawa | 363/21 |
| 5,508,904 | 4/1996 | Hara | 363/21 |

FOREIGN PATENT DOCUMENTS

3420033  12/1985  Germany .
4-124710  4/1992  Japan .
4-304170  10/1992  Japan .

*Primary Examiner*—Peter S. Wong
*Assistant Examiner*—Y. J. Han
*Attorney, Agent, or Firm*—Birch, Stewart, Kolasch & Birch, LLP

[57] ABSTRACT

A high-voltage power pack includes: a switching circuit for effecting switching control of a low-voltage d.c. signal to generate a low-voltage a.c. signal; a high-voltage transformer for increasing the voltage of the low-voltage a.c. signal outputted from the switching circuit to generate a high-voltage a.c. signal; a combination of a rectifying circuit and a low-pass filter for rectifying and smoothing the high-voltage a.c. signal to generate a high-voltage d.c. signal; resistors dividing the high-voltage d.c. signal obtained from and smoothed through the rectifying circuit and low-pass filter; a feedback circuit for controlling the switching circuit so that the potential at a divided point between the resistors may be kept constant; and an a.c. power source for applying an alternating current to the divided point, the alternating current having a frequency component transmissible through the low-pass filter, whereby an a.c. superimposed voltage made of the high-voltage d.c. signal with an a.c. voltage superimposed is obtained from the output side of the low-pass filter.

5 Claims, 7 Drawing Sheets

Va : INPUT VOLTAGE
Vb : OUTPUT VOLTAGE

FIG. 8B

Va : INPUT VOLTAGE
ib : OUTPUT CURRENT

HIGH-VOLTAGE POWER PACK

BACKGROUND OF THE INVENTION

(1) Field of the Invention

The present invention relates to a high-voltage power pack for use in an electrophotographic apparatus such as copiers, printers facsimiles and the like, and the present invention is particularly directed to reduce the size and weight of the high-voltage power pack.

(2) Description of the Prior Art

In electrophotographic apparatuses, a contacting member such as a charging brush or the like has been used in order to charge the surface of the photoreceptive drum at an uniform surface potential. In order to charge the photoreceptive drum, this contacting member is applied with a steady voltage with a superimposed a.c. component (to be referred to, hereinbelow, as an a.c. superimposed voltage).

Figure 1:
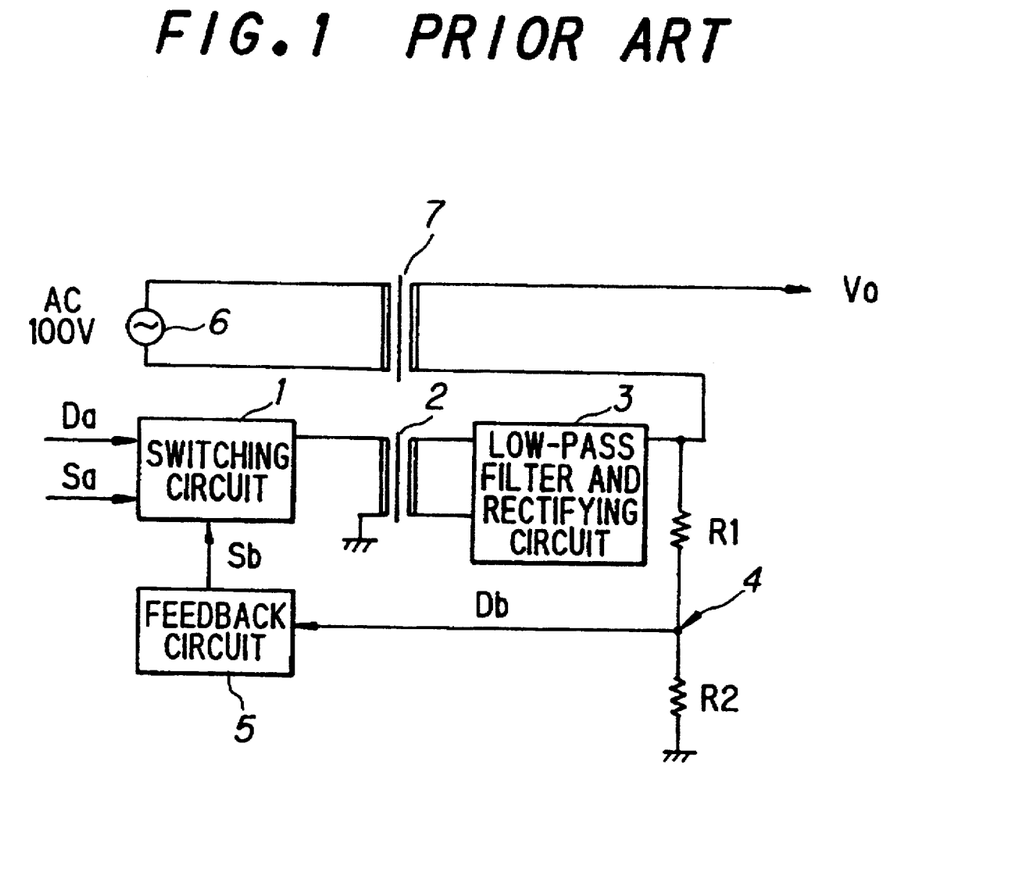
FIG. 1 is a block diagram showing a prior art high-voltage power pack.

An a.c. superimposed voltage is composed of a predetermined d.c. voltage and an a.c. voltage superimposed. In order to provides an a.c. superimposed voltage, a typical power pack shown in FIG. 1 is used. In the figure, a switching circuit 1 effects switching control of a d.c. low-voltage signal Da referring to a control signal Sa, so as to output an a.c. low-voltage power to the primary winding of a high-voltage transformer 2.

The high-voltage transformer 2 generates an a.c. high-voltage on the secondary winding side. The thus generated a.c. high-voltage is supplied to a low-pass filter (LPF) 3 where the voltage is smoothed. The voltage, then is supplied to divider resistors R1 and R2 as a d.c. high-voltage. An output potential of a divided point 4 between the divider resistors R1 and R2 is inputted to a feedback circuit 5 as a d.c. voltage signal Db, so that the feedback circuit 5 generates a control signal Sb for controlling the switching circuit 1 to maintain the potential at the divided point 4 constant.

In order to obtain an a.c. superimposed voltage by superimposing an alternating voltage to the thus obtained d.c. high-voltage, a high-voltage transformer 7 having its primary winding supplied from a commercial a.c. power supply 6 is provided so that the output on the secondary winding side of the high-voltage transformer 7 is connected in series with the output of the LPF3.

In this way, the prior art configuration required a separate high-voltage transformer 7, thus the power pack became expensive and relatively bulky. To deal with this, a high-voltage power pack was disclosed in, for example, Japanese Patent Application Laid-Open Hei 4 No.304,170 (Title : A high-voltage a.c. voltage generating circuit) that, in order to make a high-voltage transformer compact, a high-frequency a.c. voltage was tried to be used as a power supply to the primary side of the high-voltage transformer for superimposing an a.c. voltage.

When a high-frequency voltage is used as a superimposed alternating voltage, the high-frequency voltage causes the shaft of the charging brush used in electrophotographic apparatuses to vibrate, thus generating a rasping sound during the charging process. Therefore, a range of frequencies to be used is preferably less than 100 Hz. However, it is difficult to make the high-voltage transformer compact using a voltage of less than 100 Hz.

There are two kinds of means for obtaining an a.c. voltage to be supplied to the primary side of the high-voltage transformer. A first one is a sinusoidal wave generator such as Hartley oscillators, Colpitts oscillators and the like. The other one is a method of using the same commercial power supply used in the main appliance itself. The former, however, requires an expensive circuit in order to obtain a stable output while the latter requires several kinds of high-voltage transformers in conformity with local voltages and suffers from a problem that the voltage variation of the power supply directly causes the output of a.c. high-voltage to vary, presenting adverse influences on quality of output images.

Japanese Patent Application Laid-Open Hei 4 No.124,710 (Title: A power pack) discloses a method of generating an alternating voltage by using a pair of forward and reversal rectifying means and oscillators. But, this configuration requires operational amplifiers and oscillators, resulting in increased cost.

Figure 2:
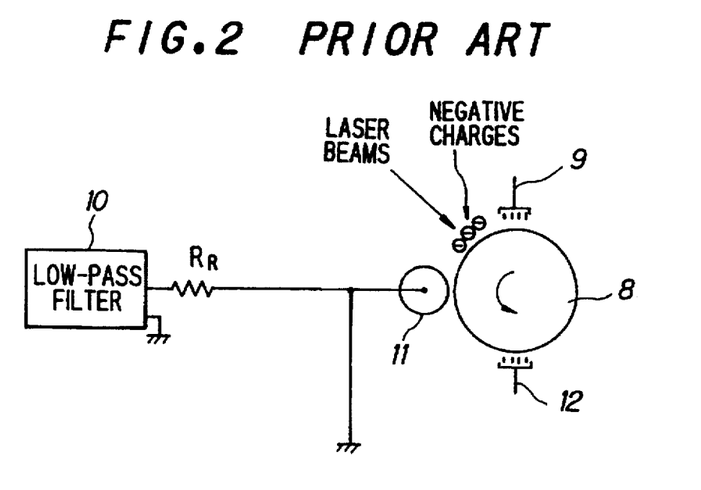
FIG. 2 is a schematic illustration showing a prior art electrophotographic apparatus.

FIG. 2 is an overall view showing a printer system of an electrophotographic apparatus. In the figure, a photoreceptive drum 8 rotates counterclockwise as designated by the arrow. In this while, the drum 8 is charged by a charging brush 9 and then is image-exposed so as to form an electrostatic latent image. Then, the latent image is developed into a toner image by a developing means 11 to which a voltage is supplied from an LPF 10. Thereafter, the toner image is transferred to a sheet of paper delivered between the drum 8 and a transfer brush 12, to thereby output a printed result.

Figure 3:
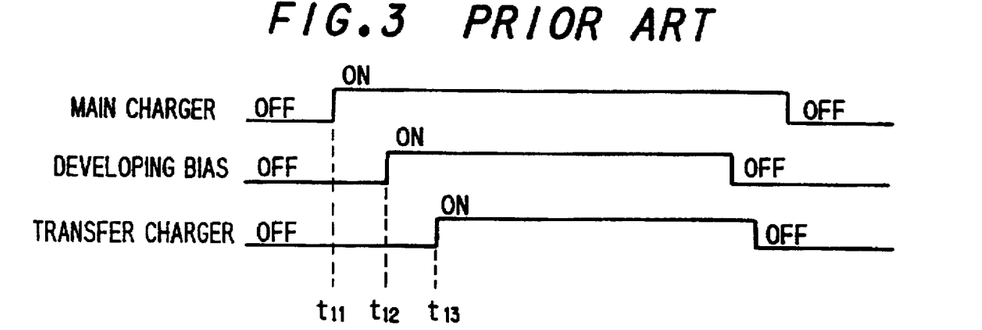
FIG. 3 is a timing chart of output waveforms in the prior art high-voltage power pack.

FIG. 3 shows a timing chart for supplying voltages to the charger, the developing bias and transfer charger during the process. Here, the charger output is turned on at a time t11. The developing bias is turned on at a time t12 when the charged portion on the photoreceptive drum 8 reaches the developing means 11. If this timing is delayed, 'fogging' appears on the resulting image.

Transfer voltage output is turned on at a time t13 when a recording material such as paper reaches the transfer brush 12. If this timing is too early, the photoreceptive drum 8 is positively charged excessively, so that this 'memory' or traces of excessive charges appear in the printing output. In this way, the prior art configuration controls the charging voltage, the developing bias and transfer voltage, separately, thus making the device bulky or heavy.

SUMMARY OF THE INVENTION

As described in the foregoing description, the conventional high-voltage power pack used in electrophotographic apparatuses requires a plurality of high-voltage transformers or needs separate output control circuits dedicated for different output circuits, resulting in a comparatively large and complicated device.

It is therefore an object of the present invention to reduce the size and cost of a high-voltage power pack for use in an electrophotographic apparatus.

In order to attain the above object, the present invention is configurated as follows:

In accordance with a first aspect of the invention, a high-voltage power pack includes: a switching circuit for effecting switching control of a low-voltage d.c. signal to generate a low-voltage a.c. signal; a high-voltage transformer for increasing the voltage of the low-voltage a.c. signal outputted from the switching circuit to generate a high-voltage a.c. signal; a combination of a rectifying circuit and a low-pass filter for rectifying and smoothing the high-voltage a.c. signal to generate a high-voltage d.c. signal; resistors dividing the high-voltage d.c. signal obtained from and smoothed through the rectifying circuit and low-pass filter; a feedback circuit for controlling the switching circuit so that the potential at a divided point between the resistors may be kept constant; and an a.c. power source for applying an alternating current to the divided point, the alternating current having a frequency component transmissible through the low-pas filter, whereby an a.c. superimposed voltage made of the high-voltage d.c. signal with an a.c. voltage superimposed is obtained from the output side of the low-pass filter.

In accordance with a second aspect of the invention, a high-voltage power pack includes: a switching circuit for effecting switching control of a low-voltage d.c. signal to generate a low-voltage a.c. signal; a high-voltage transformer for increasing the voltage of the low-voltage a.c. signal outputted from the switching circuit to generate a high-voltage a.c. signal; a combination of a rectifying circuit and a first low-pass filter for rectifying and smoothing the high-voltage a.c. signal to generate a high-voltage d.c. signal; resistors dividing the high-voltage d.c. signal obtained from and smoothed through the rectifying circuit and first low-pass filter; a feedback circuit for controlling the switching circuit so that the potential at a divided point between the resistors may be kept constant; a second low-pass filter receiving a pulse-width modulated signal created by pulse-width modulating a signal having a frequency transmissible through the first low-pass filter by a signal having a frequency which cannot be transmitted through the second low-pass filter, and demodulating the input pulse-width modulated signal to generate an a.c. voltage signal having the frequency transmissible through the first low-pass filter; and a circuit for providing the output from the second low-pass filter to the divided point between the resistors, whereby an a.c. superimposed voltage made of the high-voltage d.c. signal with an a.c. voltage superimposed is obtained from the output side of the first low-pass filter.

In accordance with a third aspect of the invention, a high-voltage power pack includes: a switching circuit for effecting switching control of a low-voltage d.c. signal to generate a low-voltage a.c. signal; a high-voltage transformer for increasing the voltage of the low-voltage a.c. signal outputted from the switching circuit to generate a high-voltage a.c. signal; a combination of a rectifying circuit and a first low-pass filter for rectifying and smoothing the high-voltage a.c. signal to generate a high-voltage d.c. signal; resistors dividing the high-voltage d.c. signal obtained from and smoothed through the rectifying circuit and first low-pass filter; a feedback circuit for controlling the switching circuit so that the potential at a divided point between the resistors may be kept constant; a second low-pass filter receiving a pulse-width modulated signal created by pulse-width modulating a signal having a frequency transmissible through the first low-pass filter by a signal having a frequency which cannot be transmitted through the second low-pass filter, and demodulating the input pulse-width modulated signal to generate an a.c. voltage signal having the frequency transmissible through the first low-pass filter; and a voltage-current converting circuit for converting the voltage output from the second low-pass filter into a current so that the converted current is supplied to the divided point between the resistors, whereby an a.c. superimposed voltage made of the high-voltage d.c. signal with an a.c. voltage superimposed is obtained from the output side of the first low-pass filter.

In accordance with a fourth aspect of the invention, a high-voltage power pack for use in an electrophotographic apparatus, is constructed so that a common output controlling circuit formed of a reverse-current checking diode and a voltage-setup element disposed on the side of the output for developing bias is provided to control both the output for developing bias and the output for transfer charger.

According to the first aspect of the invention, since a smoothed voltage obtained through the low-pass filter is divided by divider resistors and an a.c. current transmissible through the low-pass filter is applied to the divided point, it is possible to obtain an a.c. superimposed output voltage using only low-cost parts such as diodes, resistors, capacitors and the like.

Since the second and third feature of the invention are configured so that a pulse-width modulated pulse signal is demodulated to be used as a power source for supplying a superimposing voltage, the pulse signal can be obtained easily from a microcomputer and the like, thus making it possible to reduce the size of the device.

Since the fourth configuration of the invention is constructed so that a reverse-current checking diode and a voltage setup element are connected on the side of the output for developing bias, the means for developing bias is biased by the voltage Generated by the voltage setup element even if the output for developing bias is in the turn-off state. As a result, it is possible to prevent 'fogging' from occurring and realize a common output control, to thereby make the device compact and light-weight.

DESCRIPTION OF THE PREFERRED EMBODIMENTS

Figure 4:
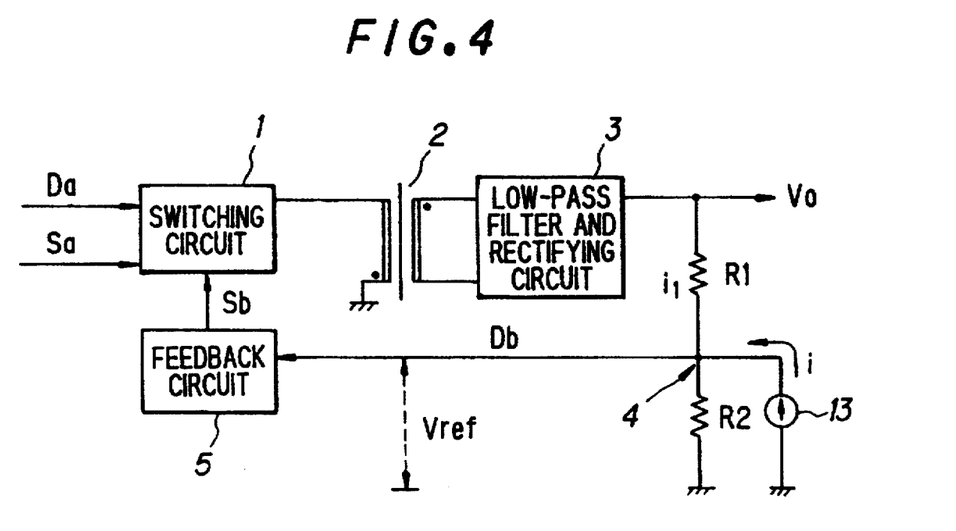
FIG. 4 is a block diagram showing a first embodiment of a high-voltage power pack in accordance with the present invention.

FIG. 4 is a block diagram showing a first embodiment of a high-voltage power pack in accordance with the present invention. In the figure, the same reference numerals are assigned to the same components with those in the prior art configuration shown in FIG. 1. In this embodiment, a switching circuit 1 effects switching control of a d.c. low-voltage signal Da supplied from an unillustrated d.c. low-voltage power source, by referring to a control signal Sa, to thereby generate an a.c. low-voltage signal to the primary winding of a high-voltage transformer 2.

The high-voltage transformer 2 outputs an a.c. high-voltage signal on the secondary winding side. The thus obtained a.c. high-voltage signal is supplied to a low-pass filter (LPF) 3 where the signal is smoothed. The voltage, then is divided by divider resistors R1 and R2 so that the smoothed voltage is stabilized. An output potential of a divided point 4 between the divider resistors R1 and R2 is inputted to a feedback circuit 5 as a d.c. voltage signal Db, so that the feedback circuit 5 generates a control signal Sb for controlling the switching circuit 1 to maintain the potential at the divided point 4 constant.

Here, if an alternating current i is applied to the divided point 4 from an a.c. current source 13, the a.c. current i flows through the resistor R2 when the a.c. superimposed voltage Vo on the output side of the LPF3 is positive while the a.c. current i flows through the register R1 when Vo is negative. Here, when the d.c. voltage signal Db has a voltage of $V_{ref}$ and the current flowing the resistor R2 is indicated by $i_2$, $$V_{ref} = R2 \times i_2$$

accordingly, $$i_2 = V_{ref}/R2.$$

As mentioned before, the feedback circuit 5 operates in such a manner that the voltage $V_{ref}$ at the divided point 4 may be constant. This means that the feedback circuit 5 operates so as to make the current $i_2$ flowing through the resistor R2 constant. Therefore, if the alternating current i is applied to the divided point 4 between the resistors R1 and R2 from the current source 13, only the current $i_1$ flowing through the resistor R1 undergoes the influence. As a result, it is possible to obtain an a.c. superimposed voltage Vo as shown next.

First, when the a.c. superimposed voltage Vo is positive, the alternating current i flows through the resistor R2 and satisfies the following relation:

$$i_2 = i_1 + i$$

∴

$$i_1 = i_2 - i \tag{1}$$

On the other hand, the feedback circuit 5 controls the switching circuit 1 so as to keep the potential at the divided point 4 at a constant voltage $V_{ref}$. That is, the feedback circuit 5 operates so that the current flowing through the resistor R2 is kept constant ($V_{ref}/R2$). Here, it is required that the response speed of the feedback circuit 5 be fast enough as compared to the frequency of the alternating current i. Accordingly, $$i_2 = V_{ref}/R2 \tag{2}$$

therefore, as Ex.(2) is substituted into Ex.(1), the following formula can be obtained:

$$i_1 = (V_{ref}/R2) - i \tag{3}$$

Accordingly, the a.c. superimposed voltage Vo is expressed as follows:

$$Vo = R1 \times i_1 + R2 \times i_2$$
$$= R1 \times i_1 + V_{ref}$$

Here, as Ex.(3) is substituted, $$Vo = R1 \times \{(V_{ref}/R2) - i\} + V_{ref} \tag{4}$$
$$= (1 + R1/R2) \times V_{ref} - R1 \times i$$

It is apparent from Ex.(4) that the a.c. superimposed voltage Vo contains an a.c. component "R1×i".

Next, when the a.c. superimposed voltage Vo is negative, the alternating current i flows through the resistor R1 and satisfies the following relation:

$$i_1 = i_2 + i \tag{5}$$

On the other hand, the feedback circuit 5 controls the switching circuit 1 so as to keep the potential at the divided point 4 at the constant voltage $V_{ref}$. Therefore, the feedback circuit 5 operates so that the current $i_2$ is kept constant. Accordingly, $$V_{ref} = R2 \times i_2$$

∴

$$i_2 = V_{ref}/R2 \tag{6}.$$

AS Ex.(5) is substituted into Ex.(6), the following formula can be obtained:

$$i_1 = V_{ref}/R2 + i \tag{7}$$

Accordingly, the a.c. superimposed voltage Vo is expressed as follows:

$$VO = R1 \times i_1 + R2 \times i_2 \tag{8}$$
$$= R1 \times (V_{ref}/R2 + i) + V_{ref}$$
$$= (1 + R1/R2) \times V_{ref} + R1 \times i$$

It is apparent from Ex.(8) that the a.c. superimposed voltage Vo contains an a.c. component "R1×i".

Thus, according to the invention, it is possible to obtain an a.c. superimposed voltage using a simple circuit without needing any large-sized high-voltage transformer. Accordingly, it is possible to reduce the size and cost of the device. It is noted that, in a practical configuration of the circuit, the dividing ratio between the resistors R1 and R2 and the amplitude of the applied current i should be determined so that the maximum value of the resulting a.c. superimposed voltage may not exceed the capacity of the power pack.

Figure 5:
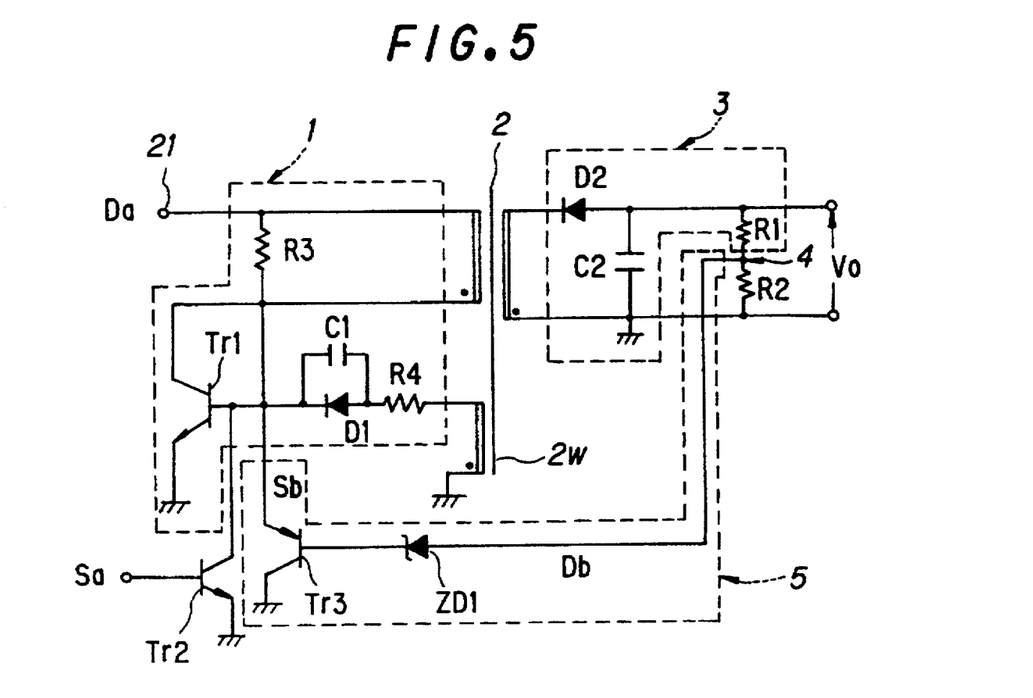
FIG. 5 is a circuit diagram showing a specific configuration of the embodiment shown in FIG. 4.

FIG. 5 is a circuit diagram showing a specific example of a high-voltage power pack in accordance with the invention. In the figure, an RCC (Ringing Choke Converter) type circuit is used as the switching circuit 1.

The switching circuit 1, receives a low-voltage d.c. signal Da from an input terminal 21 and controls the signal Da by effecting switching control or ON/OFF control using a switching transistor Tr1. When the control signal Sa is at low level, a transistor Tr2 connected to the base terminal of the transistor Tr1 is turned off, so that the switching circuit 1 effects the switching operation. In contrast, when the control signal Sa is at high level, the transistor Tr2 is turned on so that the base voltage of the switching transistor Tr1 lowers to stop the switching operation, whereby the output is made off. Here, a resistor R3 disposed between the input terminal 21 and the base terminal of the transistor Tr1 is a starting resistor to activate oscillation.

The high-voltage transformer 2 has a winding line 2w for supplying power to the circuit. The output from this winding line 2w is rectified through a series composed of a resistor R4 and a parallel circuit of a diode D1 and a capacitor C1. The thus rectified electric power is inputted to the base terminal of the switching transistor Tr1 as a circuit control power source.

The low-pass filter 3 is composed of a smoothing circuit made of a diode D2 and a capacitor C2, and the divider resistor R1. In this example, the divider resistor R1 is used as a part of the low-pass filter 3. The divided point 4 is a junction between the resistors R1 and R2.

The feedback circuit 5 is formed of a Zener diode ZD1 and a transistor Tr3. Here, the Zener voltage of the Zener diode ZD1 is referred to as Vz, the resistors R1 and R2 is selected to satisfy the following relation:

$$Vz = R2 \times \{Vo/(R1+R2)\}.$$

When $|V_{ref}| \leq |Vz|$ holds, where $V_{ref}$ is the potential at the divided point or the voltage applied across the resistor R2, or when the absolute value of the a.c. superimposed voltage Vo is not more than the designated level, no reverse current will flow through the Zener diode ZD1. Accordingly, the transistor Tr2 is turned off, so that the switching transistor 1 continues to effect the switching operation.

When $|V_{ref}| > |Vz|$ holds or when the absolute value of the a.c. superimposed voltage Vo exceeds the designated level, a reverse current flows through the Zener diode ZD1. Accordingly, the transistor Tr3 is turned on, so that the base voltage of the switching transistor 1 lowers to thereby stop the switching operation. In this manner, the feedback control is carried out so as to keep the voltage $V_{ref}$ at the divide point 4 constant.

Figure 6:
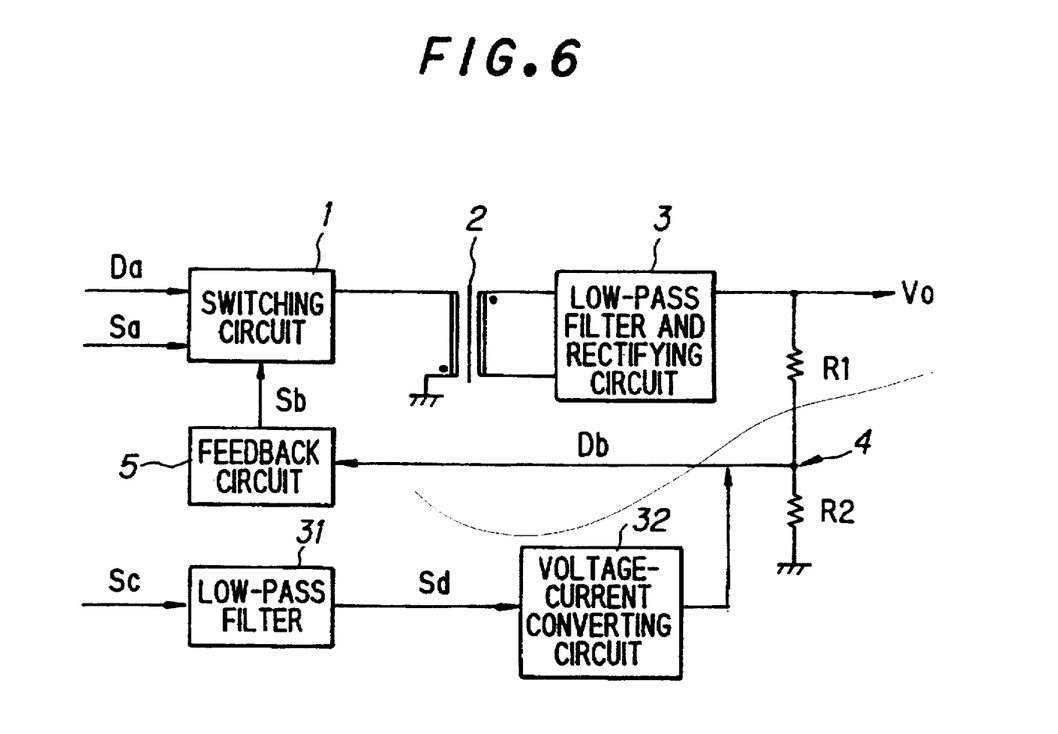
FIG. 6 is a block diagram showing a second embodiment of a high-voltage power pack in accordance with the present invention.

FIG. 6 is a block diagram showing a second embodiment of a high-voltage power pack of the present invention. In this embodiment, it is possible to obtain an a.c. current applied to a divided point 4 between resistors R1 and R2. In this embodiment, a switching circuit 1 supplies its output to the primary side of a high-voltage transformer 2 and is controlled by a feedback circuit 5 through a control signal Sb so that a voltage $V_{ref}$ at the divided point 4 between the resistors R1 and R2 may becomes constant. This embodiment contains a low-pass filter 31 and a voltage-current converting circuit 32, in addition to a low-pass filter 3 for smoothing the secondary output from a high-voltage transformer 2.

An input signal Sc to the low-pass filter 31 is formed by subjecting a signal having a first frequency f1 transmissible through both the low-pass filters 3 and 31 to pulse-width modulation (PWM) of a second frequency f2 which cannot be transmitted through the low-pass filter 31. This signal can typically be obtained from an output port from a microcomputer and the like.

Figure 7A:
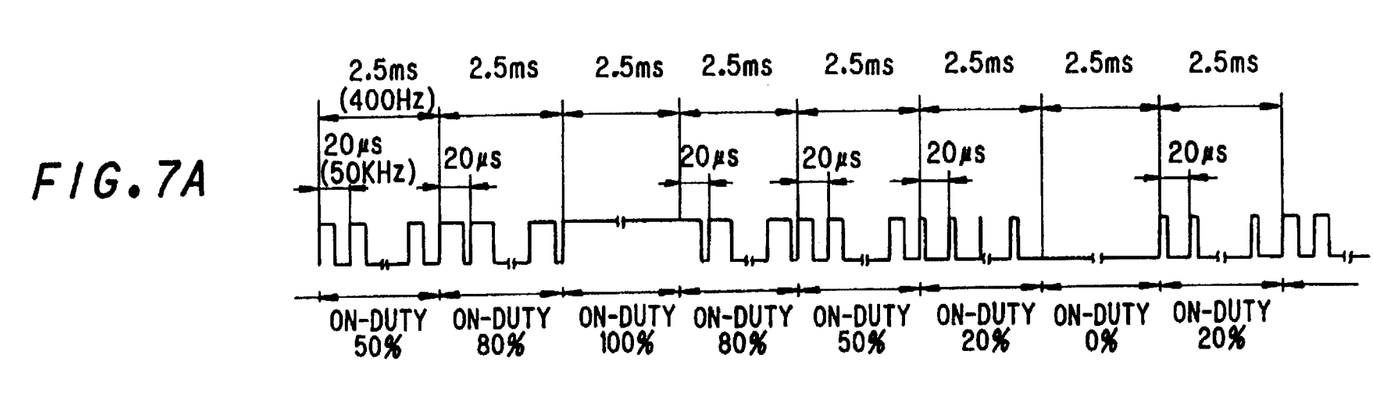
FIG. 7A is a chart showing a pulse-width modulated waveform for illustrating the operation of the second embodiment.

The signal Sc is a pulse train of, for example, a first frequency f1 of 50 Hz (period: 20 ms) modulated by a second frequency f2 of 50 kHz (period: 0.02 ms), as shown in FIG. 7A. More specifically, on the signal Sc, periodic pulses having a specific on-duty ratio is outputted every 0.02 ms while the duty ratio is changed every 2.5 ms (400 Hz) cyclically of eight patterns, or more explicitly in the order of 50%, 80%, 100%, 80%, 50%, 20%, 0% and 20%.

Figure 7B:
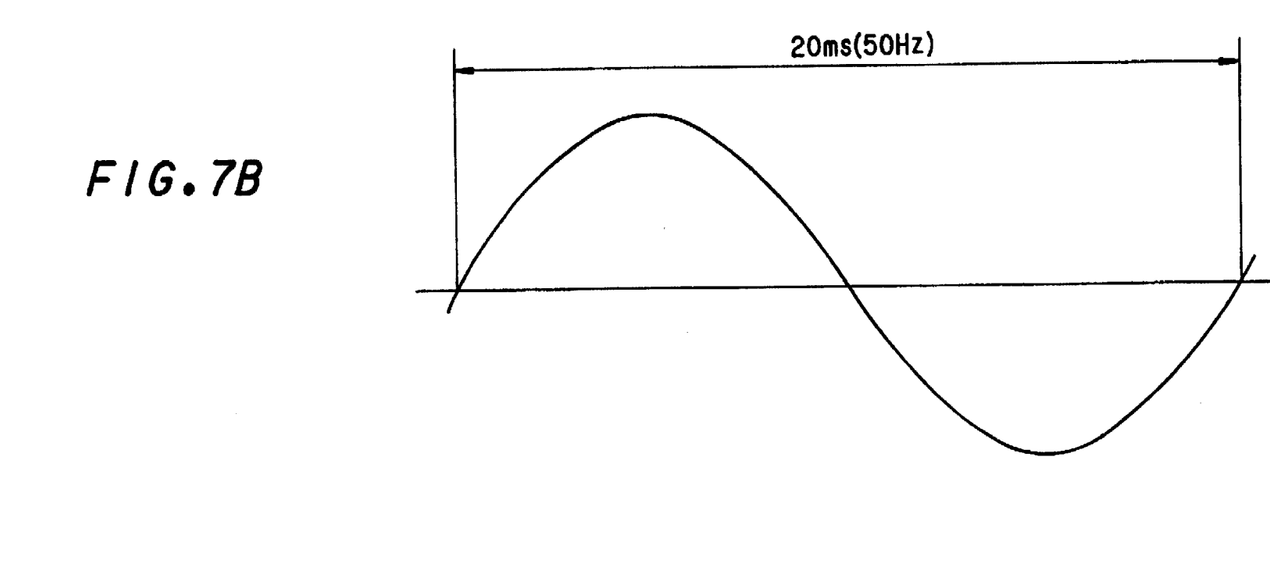
FIG. 7B is a chart showing a waveform of a demodulated voltage for illustrating the operation of the second embodiment.
Figure 8A:
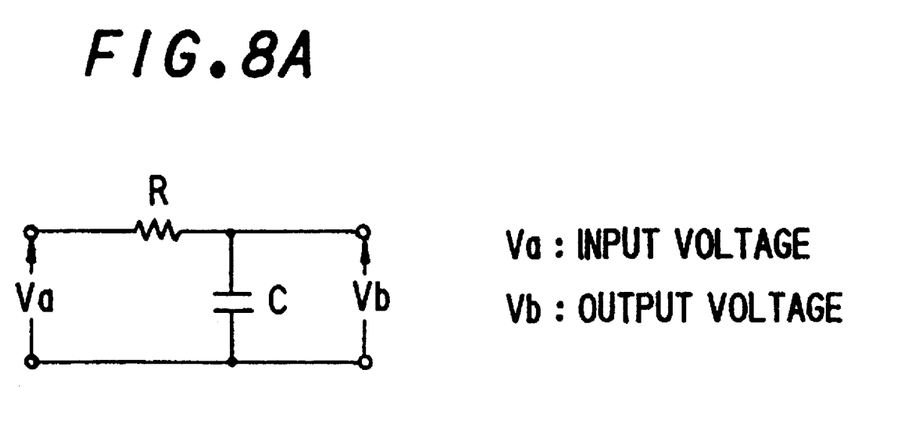
FIG. 8A is an illustrative view showing a specific circuit diagram of a low-pass filter used in the second embodiment.

The cycle of variations is 50 Hz (=400 Hz/8). Thus, it is understood that the signal Sc is of three frequency components, that is, 50 Hz, 400 Hz and 50 kHz. When the device elements of the low-pass filter 31 are so set up as to pass waves of 50 Hz and cut waves of 400 Hz and 50 kHz, the signal Sc is demodulated by the low-pass filter into an a.c. voltage signal Sd of the frequency f1 (50 Hz in this example) as shown in FIG. 7B. A typical example of the low-pass filter 31 is constituted by a CR type circuit as shown in FIG. 8A.

Figure 8B:
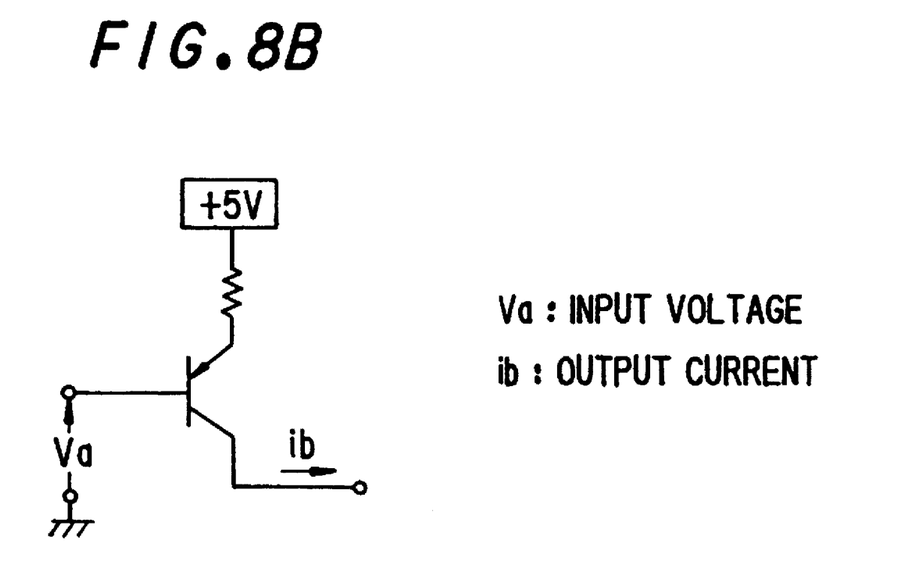
FIG. 8B is an illustrative view showing a specific circuit diagram of a voltage-current converting circuit used in the second embodiment.

An example of the voltage-current converting circuit 32 for converting the a.c. voltage signal Sd into the a.c. current of 50 Hz and supplying the current to the divided point 4 may be constructed by a transistor circuit shown in FIG. 8B.

Figure 9:
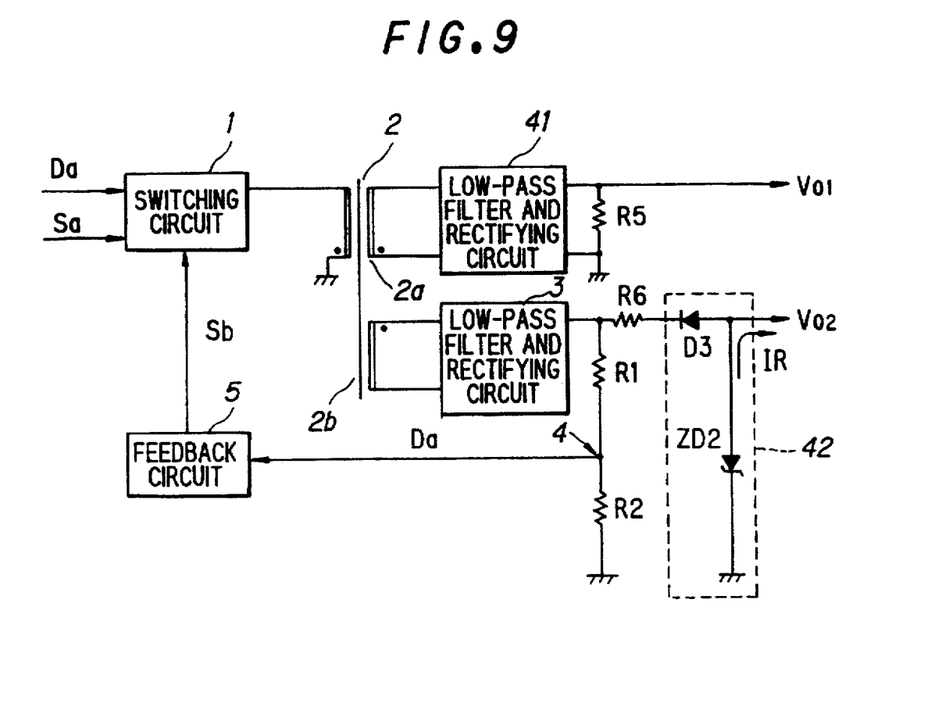
FIG. 9 is a block diagram showing a third embodiment of a high-voltage power pack in accordance with the present invention.

FIG. 9 is a block diagram showing a third embodiment of a high-voltage power pack of the invention. This embodiment is a configuration of commonly controlling both the high-voltage output for a transfer charger and the high-voltage output for developing bias. In the embodiment, a high-voltage transformer excited by a switching circuit 1 has two output side winding lines, that is, a secondary winding 2a for transfer charger output and a third winding 2b for developing bias. The output from the secondary winding 2a is smoothed by a low-pass filter 41 and the thus smoothed voltage is stabilized by a resistor R5 to supply a high-voltage output Vo1 for transfer charger.

The output from the third winding 2b is smoothed by a low-pass filter 3 and the thus smoothed voltage is stabilized and divided by divider resistors R1 and R2. The switching circuit 1 is controlled by a control signal Sb outputted from a feedback circuit 5 so that a voltage signal Da from the divided point 4 may be kept constant.

Accordingly, since the secondary winding 2a and the third winding 2b are both magnetically linked with the primary winding, the high-voltage output Vo1 for transfer charger from the secondary winding 2a and the high-voltage output Vo2 for developing bias from the third winding 2b, can be commonly controlled. To permit this configuration, this embodiment further includes a self-bias circuit 42 consisting of a reverse-current checking diode D3 and a voltage-setup element ZD2 (Zener diode in this embodiment), on the side of the high-voltage output Vo2 for developing bias.

A resistor R6 is provided in order to make the feedback circuit 5 function properly. Without provision of the resistor R6, if the absolute value of the output Vo2 for developing bias or |Vo2| exceeds a designated value, the output Vo2 is always held at a fixed value by the voltage-setup element ZD2. Therefore, the feedback circuit 5 cannot be functioned.

Figure 10:
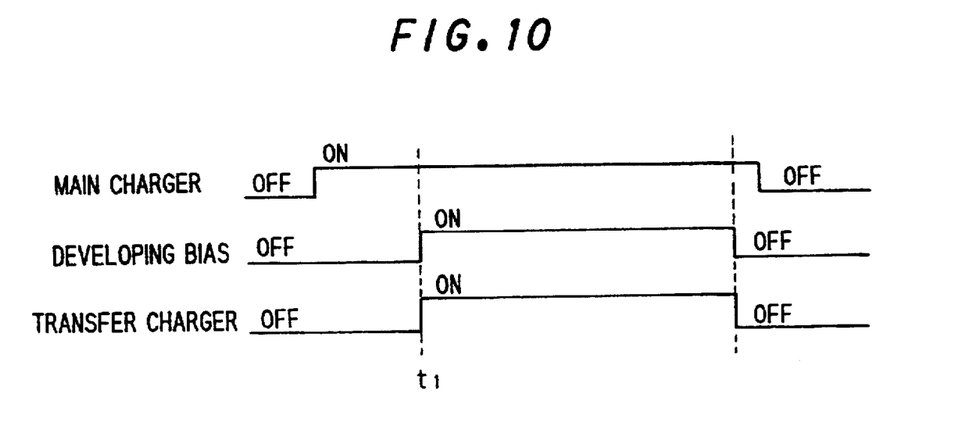
FIG. 10 is a timing chart of output waveforms in the embodiment of the high-voltage power pack shown in FIG. 9.

In this arrangement, the potential difference between the surface potential of the photoreceptive drum 8 and the ground causes a reverse current IR to flow through the Zener diode ZD2, so that the developing means 11 will be biased at the Zener voltage of the Zener diode ZD2. As a result, if the output for developing bias is turned on at t1 in time with the activation of the output for transfer charger, as shown in FIG. 10, no 'fogging' will occur, making it possible to provide an excellent printout.

In the third embodiment shown in FIG. 9, although a Zener diode is used as a voltage-setup element, any other device element can be used. It is also possible to obtain an input signal to the feedback circuit 5 from the transfer output side.

According to the invention, a smoothed voltage which is generated from an a.c. high-voltage by a low-pass filter, is divided by divider resistors, and an a.c. current which is transmissible through the low-pass filter is applied to the divided point. Therefore, it is possible to obtain an a.c. superimposed output voltage without providing any large-sized low-frequency high-voltage transformer. As a result, it is possible to not only reduce the size and weight as well as part cost of the apparatus but also to facilitate the manufacture, shipping, usage and maintenance.

The present invention is configurated so that an a.c. voltage signal is obtained by demodulating a pulse-width modulated pulse signal and the thus obtained a.c. voltage signal is current-converted so as to be used as an applied a.c. current. Accordingly, it is possible to obtain an a.c. power source using a micro-electronic circuit such as of a microcomputer etc. In consequence, it is possible to not only reduce the size but also to provide an electrophotographic apparatus which works stably regardless of circumstances of the commercial power supply.

The present invention is configured so that the output for developing bias and the output for transfer charger are controlled by a common output controlling circuit. This configuration further reduces the power pack in size and weight, to thereby bring a markedly great effect.

What is claimed is:

1. A high-voltage power pack comprising:

a switching circuit for effecting switching control of a low-voltage d.c. signal to generate a low-voltage a.c. signal;

a high-voltage transformer for increasing the voltage of said low-voltage a.c. signal outputted from said switching circuit to generate a high-voltage a.c. signal;

a combination of a rectifying circuit and a low-pass filter for rectifying and smoothing said high-voltage a.c. signal to generate a high-voltage d.c. signal;

resistance elements dividing said high-voltage d.c. signal obtained from and smoothed through said rectifying circuit and low-pass filter;

a feedback circuit for controlling said switching circuit so that the potential at a divided point between said resistance elements is kept constant; and an a.c. power source for applying an alternating current to said divided point, said alternating current having a frequency component transmissible through said low-pass filter, whereby an a.c. superimposed voltage made of said high-voltage d.c. signal with an a.c. voltage superimposed is obtained from an output side of said low-pass filter.

2. A high-voltage power pack according to claim 1, wherein said a.c. power source is a current source.

3. A high-voltage power pack according to claim 1, wherein said feedback circuit includes a zener diode and a transistor, said zener diode being connected between said divided point and a base of said transistor.

4. A high-voltage power pack comprising:

a switching circuit for effecting switching control of a low-voltage d.c. signal to generate a low-voltage a.c. signal;

a high-voltage transformer for increasing the voltage of said low-voltage a.c. signal outputted from said switching circuit to generate a high-voltage a.c. signal;

a combination of a rectifying circuit and a first low-pass filter for rectifying and smoothing said high-voltage a.c. signal to generate a high-voltage d.c. signal;

resistance elements dividing said high-voltage d.c. signal obtained from and smoothed through said rectifying circuit and first low-pass filter;

a feedback circuit for controlling said switching circuit so that the potential at a divided point between said resistance elements is kept constant;

a second low-pass filter receiving a pulse-width modulated signal created by pulse-width modulating a signal having a frequency transmissible through said first low-pass filter by a signal having a frequency which cannot be transmitted through the second low-pass filter, and demodulating said input pulse-width modulated signal to generate and a.c. voltage signal having the frequency transmissible through said first low-pass filter; and a circuit for providing the output from said second low-pass filter to the divided point between said resistance elements, whereby an a.c. superimposed voltage made of said high-voltage d.c. signal with an a.c. voltage superimposed is obtained from an output side of said first low-pass filter.

5. A high-voltage power pack comprising:

a switching circuit for effecting switching control of a low-voltage d.c. signal to generate a low-voltage a.c. signal;

a high-voltage transformer for increasing the voltage of said low-voltage a.c. signal outputted from said switching circuit to generate a high-voltage a.c. signal;

a combination of a rectifying circuit and a first low-pass filter for rectifying and smoothing said high-voltage a.c. signal to generate a high-voltage d.c. signal;

resistance elements dividing said high-voltage d.c. signal obtained from and smoothed through said rectifying circuit and first low-pass filter;

a feedback circuit for controlling said switching circuit so that the potential at a divided point between said resistance elements is kept constant;

a second low-pass filter receiving a pulse-width modulated signal created by pulse-width modulating a signal having a frequency transmissible through said first low-pass filter by a signal having a frequency which cannot be transmitted through the second low-pass filter, and demodulating said input pulse-width modulated signal to generate an a.c. voltage signal having the frequency transmissible through said first low-pass filter; and a voltage-current converting circuit for converting the voltage output from said second low-pass filter into a current so that the converted current is supplied to the divided point between said resistance elements, whereby an a.c. superimposed voltage made of said high-voltage d.c. signal with an a.c. voltage superimposed is obtained from an output side of said first low-pass filter.

* * * * *